US010224745B2

(12) United States Patent
Easton et al.

(10) Patent No.: US 10,224,745 B2
(45) Date of Patent: Mar. 5, 2019

(54) REMOVABLE INDUCTIVE POWER TRANSFER PAD

(71) Applicant: Wireless Advanced Vehicle Electrification, Inc., Salt Lake City, UT (US)

(72) Inventors: Mark H Easton, Riverton, UT (US); Jeff Easton, Cottonwood Heights, UT (US)

(73) Assignee: Wireless Advanced Vehicle Electrification, Inc., Salt Lake City, UT (US)

( * ) Notice: Subject to any disclaimer, the term of this patent is extended or adjusted under 35 U.S.C. 154(b) by 132 days.

(21) Appl. No.: 15/130,585

(22) Filed: Apr. 15, 2016

(65) Prior Publication Data

US 2016/0308391 A1 Oct. 20, 2016

Related U.S. Application Data

(60) Provisional application No. 62/148,086, filed on Apr. 15, 2015.

(51) Int. Cl.
*H02J 7/00* (2006.01)
*H02J 7/14* (2006.01)
(Continued)

(52) U.S. Cl.
CPC ............. *H02J 50/10* (2016.02); *B60L 11/182* (2013.01); *B60L 11/1809* (2013.01);
(Continued)

(58) Field of Classification Search
USPC ................. 320/107, 108, 109, 137; 307/104
See application file for complete search history.

(56) References Cited

U.S. PATENT DOCUMENTS 9,682,632 B2 * 6/2017 Brill ...................... B60L 11/182
2012/0043172 A1 * 2/2012 Ichikawa ................ B60L 5/005
191/45 R
(Continued)

FOREIGN PATENT DOCUMENTS

CA 2908352 10/2014
JP 2008288889 11/2008
(Continued)

OTHER PUBLICATIONS

PCT Application No. PCT/US16/27965, Filed Apr. 15, 2016, International Search Report and Written Opinion dated Sep. 22, 2016.
(Continued)

*Primary Examiner* — Alexis Pacheco
(74) *Attorney, Agent, or Firm* — Kunzler, PC; Bruce Ray Needham

(57) ABSTRACT

An apparatus for a removable inductive power pad is disclosed. The apparatus includes a frame with an opening in a top surface of the frame, and includes a removable pad with an inductive power transfer ("IPT") pad embedded therein. The IPT pad is shaped to transmit power to a receiver pad positioned above the removable pad. The removable pad is sized to conform to the opening, where the opening of the frame is shaped to support the removable pad and the removable pad and the opening are sized so that a top surface of the removable pad is substantially level with the top surface of the frame. When the frame is located in a roadway, the frame and removable pad mounted in the opening of the frame are rated for vehicular traffic to drive over the frame and/or the removable pad without damaging the frame or the removable pad.

18 Claims, 7 Drawing Sheets

(51) Int. Cl.
  *H02J 50/10*  (2016.01)
  *B60L 11/18*  (2006.01)
  *H02J 50/60*  (2016.01)
  *H02J 7/02*  (2016.01)

(52) U.S. Cl.
  CPC ......... *B60L 11/1824* (2013.01); *H02J 7/0027* (2013.01); *H02J 7/0042* (2013.01); *H02J 7/025* (2013.01); *H02J 50/60* (2016.02)

(56) References Cited

U.S. PATENT DOCUMENTS

| | | | | |
|---|---|---|---|---|
| 2012/0235504 | A1* | 9/2012 | Kesler | H03H 7/40 307/104 |
| 2012/0235566 | A1* | 9/2012 | Karalis | H03H 7/40 315/70 |
| 2013/0181667 | A1* | 7/2013 | Takeshita | B60L 11/182 320/108 |
| 2014/0080003 | A1* | 3/2014 | Tsuji | H01M 10/0525 429/231.1 |
| 2014/0333256 | A1* | 11/2014 | Widmer | B60L 11/182 320/108 |
| 2015/0183326 | A1* | 7/2015 | Ryberg | B60L 11/1809 320/109 |
| 2015/0246614 | A1* | 9/2015 | Dames | B60L 5/005 191/10 |
| 2015/0302985 | A1* | 10/2015 | Kurs | H01F 38/14 307/104 |

FOREIGN PATENT DOCUMENTS

| | | |
|---|---|---|
| RU | 2408476 | 1/2011 |
| WO | 2015045920 | 2/2015 |

OTHER PUBLICATIONS drive2.com, Japanese puzzled wireless charging of electric vehicles, Pavel Greshnykh, 2016, https://www.drive2.com/c/958023, Last visited Sep. 22, 2016.

* cited by examiner

Section AA

Section BB

Detail A

Detail B

Detail C

Detail D

REMOVABLE INDUCTIVE POWER TRANSFER PAD

FIELD

This invention relates to wireless power transfer and more particularly relates to a removable inductive power transfer pad for wireless power transfer.

BACKGROUND

Fossil fuel vehicles produce pollutants and use natural resources that are typically not renewable. To reduce pollution, electric powered vehicles are becoming increasingly popular. For example, many cities are moving toward electric mass transit vehicles to reduce pollution. Mass transit vehicles powered by overhead power lines have disadvantages, such as high cost and unsightly overhead power lines. Battery powered mass transit vehicles have many advantages. However, most battery powered mass transit vehicles have batteries sized to run for an extended period between charging. A better solution is to incrementally charge mass transit vehicles at various stops along a route. Other types of vehicles may also benefit from road-mounted charging locations.

SUMMARY

An apparatus for a removable inductive power pad is disclosed. The apparatus includes a frame with an opening in a top surface of the frame, and includes a removable pad with an inductive power transfer ("IPT") pad embedded therein. The IPT pad is shaped to transmit power to a receiver pad positioned above the removable pad. The removable pad is sized to conform to the opening, where the opening of the frame is shaped to support the removable pad and the removable pad and the opening are sized so that a top surface of the removable pad is substantially level with the top surface of the frame. When the frame is located in a roadway, the frame and removable pad mounted in the opening of the frame are rated for vehicular traffic to drive over the frame and/or the removable pad without damaging the frame or the removable pad.

In one embodiment, the rating for vehicular traffic includes an American Association of State Highway and Transportation Officials ("AASHTO") H-20 rating for heavy duty vehicular traffic. In another embodiment, the removable pad includes a removable pad material and the IPT pad is embedded in the removable pad material. In another embodiment, the removable pad material includes a polymeric matrix and the IPT pad is embedded in the polymeric matrix. In another embodiment, the removable pad material includes a foam. In a further embodiment, the foam includes a syntactic foam and the syntactic foam includes a resin and an aggregate. In another example, the aggregate includes one or more of glass particles, ceramic particles, nano particles, plastic particles, and fiberglass fibers. In yet another embodiment, the resin includes one or more of a vinylester, a polyester resin, a polyacrylamide, and an epoxy. In another embodiment, at least one exterior layer of the removable pad material includes fiberglass.

In one embodiment, the apparatus includes one or more wire vias extending from a bottom of the removable pad positioned within the opening to an exterior edge of the frame. The bottom of the removable pad is distal to the top surface of the removable pad and the one or more wire vias are sized for wiring extending from the removable pad to at least the exterior edge of the frame and/or electrical devices within the frame. In another embodiment, the apparatus includes one or more sealing mechanisms that secure the removable pad to the frame and inhibit liquid from entering the one or more wire vias.

In one embodiment, the removable pad includes a removable pad material and the IPT pad is embedded in the removable pad material and the removable pad includes a bottom plate. A bottom surface of the bottom plate includes a bottom of the removable pad where the IPT pad is positioned within the removable pad material and the bottom plate is between the IPT pad and the bottom of the removable pad. The bottom plate includes one or more openings coincident with the one or more wire vias positioned in the frame. In another embodiment, the bottom plate is primarily aluminum and the bottom of the opening includes a metal plate where the bottom plate of the removable pad is flush with the metal plate and in contact with the metal plate when the removable pad is positioned in the opening.

In another embodiment, the one or more sealing mechanisms include one or more o-rings mounted between the removable pad and the bottom of the opening in the frame, where at least one o-ring surrounds each of the one or more wire vias and inhibits liquid from the top surfaces of the frame and removable pad from reaching the one or more wire vias when the removable pad is mounted in the opening of the frame. In another embodiment, the one or more sealing mechanisms include a locking ring positioned around a perimeter of the top surface of the removable pad and one or more coupling mechanisms that couple the locking ring to the frame, where the locking ring exerts a downward force on the removable pad to secure the removable pad in the opening when the coupling mechanisms couple the locking ring to the frame.

In another embodiment, the one or more sealing mechanisms include a seal positioned within a gap between sides of the removable pad and sides of the opening, where the seal fills the gap to inhibit liquid from the top surfaces of the frame and removable pad from reaching the bottom of the opening and the bottom of the removable pad when the removable pad is mounted in the opening of the frame. In another embodiment, the one or more sealing mechanisms include a seal positioned within a gap between sides of the removable pad and the locking ring, where the seal fills the gap to inhibit liquid from top surfaces of the apparatus from reaching the bottom of the opening and the bottom of the removable pad when the removable pad is mounted in the opening of the frame.

In another embodiment, the one or more sealing mechanisms include a seal positioned within a gap between sides of the frame and the locking ring, where the seal fills the gap to inhibit liquid from top surfaces of the apparatus from reaching the bottom of the opening and the bottom of the removable pad when the removable pad is mounted in the opening of the frame. In another embodiment, the one or more sealing mechanisms include a dielectric grease that fills a space surrounding wiring within each of the one or more wire vias. In another embodiment, where the removable pad includes at least one coupling device connected to the bottom of the removable pad and extending into a wire via of the one or more wire vias, the one or more sealing mechanisms include a seal positioned within a gap between the at least one coupling device and the wire via, where the seal fills the gap to inhibit liquid from the top surfaces of the frame and removable pad from reaching the wire via.

In one embodiment, the opening in the frame is a first opening and the apparatus includes a second opening in the top surface of the frame and a cover for the second opening. The second opening is positioned adjacent to the first opening and the cover is sized to conform to the second opening. The second opening of the frame is shaped to support the cover and the cover and the second opening are sized so that a top surface of the cover is substantially level with the top surface of the frame. The frame with the cover mounted in the second opening of the frame are rated for vehicular traffic to drive over the cover without damaging the frame or the cover. In another embodiment, the second opening includes one or more junction boxes positioned within one or more wire vias extending from a bottom of the removable pad positioned within the opening to an exterior edge of the frame and the one or more junction boxes are sized for pulling wire from the removable pad and to a location connected by conduit to the wire vias and/or connectors that connect wiring from the removable pad to wiring extending to the location connected by conduit to the wire vias. In another embodiment, where the second opening includes one or more electrical devices, the one or more electrical devices are connected to the removable pad by wire running in the one or more wire vias, where the one or more electrical devices support wireless charging using the removable pad.

A method including for forming a removable pad apparatus includes creating a removable pad by mating a removable pad material with an IPT pad and connecting a bottom plate to the removable pad material of the removable pad. The IPT pad is shaped to transmit power to a receiver pad positioned above the removable pad, and the IPT pad includes a ferrite and wiring. The bottom plate includes one or more openings for the wiring extending from the IPT pad, and the wiring extends through the one or more openings. The method includes, in one embodiment, placing the removable pad in an opening in a top surface of a frame, where the frame is mounted in a roadway for vehicular traffic and where the opening of the frame is shaped to support the removable pad. The method, in one embodiment, includes routing wiring of the IPT pad in one or more wire vias extending from a bottom of the removable pad positioned within the opening to an exterior edge of the frame, where the bottom of the removable pad is distal to the top surface of the removable pad. The method, in one embodiment, includes sealing the removable pad to the frame with sealing mechanisms that secure the removable pad to the frame and inhibit liquid from entering the one or more wire vias. The frame and removable pad mounted in the opening of the frame are rated for motor vehicular traffic to drive over the frame and/or the removable pad without damaging the frame or the removable pad.

In one embodiment, mating the removable pad material with the IPT pad includes creating the removable pad material, removing material from the removable pad material to accommodate the ferrite, the wiring and a substrate for the IPT pad, placing wiring of the IPT pad within grooves in the removable pad material of the removable pad, where the wiring including wire extending beyond the removable pad, and placing ferrite within a void created by removing the material from the removable pad material.

In one embodiment, sealing the removable pad to the frame includes coupling a locking ring to the frame, where the locking ring engages the removable pad. The locking ring is positioned around a perimeter of the top surface of the removable pad and the locking ring exerts a downward force on the removable pad to secure the removable pad in the opening when coupling mechanisms couple the locking ring to the frame. In another embodiment, sealing the removable pad to the frame includes compressing one or more o-rings mounted between the removable pad and the bottom of the opening in the frame, where at least one o-ring surrounds each of the one or more wire vias and inhibits liquid from the top surfaces of the frame and removable pad from reaching the one or more wire vias when the removable pad is mounted in the opening of the frame. In another embodiment, sealing the removable pad to the frame includes placing a seal within a gap between sides of the removable pad and the locking ring, where the seal fills the gap to inhibit liquid from the top surfaces of the frame and removable pad from reaching the bottom of the opening and the bottom of the removable pad when the removable pad is mounted in the opening of the frame.

In another embodiment, sealing the removable pad to the frame includes placing a seal within a gap between sides of the removable pad and sides of the opening, where the seal fills the gap to inhibit liquid from the top surfaces of the frame and removable pad from reaching the bottom of the opening and the bottom of the removable pad when the removable pad is mounted in the opening of the frame. In another embodiment, sealing the removable pad to the frame includes placing a seal positioned within a gap between at least one coupling device and the wire via, where the seal fills the gap to inhibit liquid from the top surfaces of the frame and removable pad from reaching the wire via, and where the removable pad includes the at least one coupling device connected to the bottom of the removable pad and extending into a wire via of the one or more wire vias. In another embodiment, sealing the removable pad to the frame includes inserting a dielectric grease that fills a space surrounding wiring within each of the one or more wire vias.

Another apparatus for a removable pad includes a frame, including an opening in a top surface of the frame, and a removable pad with an IPT pad embedded therein. The IPT pad is shaped to transmit power to a receiver pad positioned above the removable pad, and the removable pad is sized to conform to the opening. The opening of the frame is shaped to support the removable pad and, in one embodiment, the removable pad and the opening are sized so that a top surface of the removable pad is substantially level with the top surface of the frame. The removable pad includes a polymeric matrix and the IPT pad is embedded in the polymeric matrix. The removable pad includes a bottom plate, where a bottom surface of the bottom plate is a bottom of the removable pad where the IPT pad is positioned within the polymeric matrix and the bottom plate is between the IPT pad and the bottom of the removable pad.

The apparatus includes one or more wire vias extending from a bottom of the removable pad positioned within the opening to an exterior edge of the frame. The bottom of the removable pad is distal to the top surface of the removable pad and the one or more wire vias are sized for wiring extending from the removable pad to at least the exterior edge of the frame and/or electrical devices within the frame. The bottom plate includes one or more openings coincident with the one or more wire vias positioned in the frame. When the frame is located in a roadway, the frame and removable pad mounted in the opening of the frame are rated for motor vehicular traffic to drive over one or more of the frame and the removable pad without damaging the frame or the removable pad.

The apparatus, in one embodiment, includes one or more o-rings mounted between the removable pad and the bottom of the opening in the frame. At least one o-ring surrounds each of the one or more wire vias and inhibits liquid from the top surfaces of the frame and removable pad from reaching the one or more wire vias when the removable pad is mounted in the opening of the frame. In another embodiment, the apparatus includes a locking ring positioned around a perimeter of the top surface of the removable pad and one or more coupling mechanisms that couple the locking ring to the frame, where the locking ring exerts a downward force on the removable pad to secure the removable pad in the opening when the one or more coupling mechanisms couple the locking ring to the frame. The apparatus, in one embodiment, includes a dielectric grease that fills a space surrounding wiring within each of the one or more wire vias.

In one embodiment, the apparatus includes a seal positioned within a gap between sides of the removable pad and the locking ring, where the seal fills the gap to inhibit liquid from the top surfaces of the frame and removable pad from reaching the bottom of the opening and the bottom of the removable pad when the removable pad is mounted in the opening of the frame. In another embodiment, the apparatus includes a seal positioned within a gap between sides of the removable pad and sides of the opening, where the seal fills the gap to inhibit liquid from the top surfaces of the frame and removable pad from reaching the bottom of the opening and the bottom of the removable pad when the removable pad is mounted in the opening of the frame. In another embodiment, the apparatus includes a seal positioned within a gap between at least one coupler and the wire via, where the seal fills the gap to inhibit liquid from the top surfaces of the frame and removable pad from reaching the wire via, where the removable pad includes the at least one coupler connected to the bottom plate of the removable pad and extending into a wire via of the one or more wire vias.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
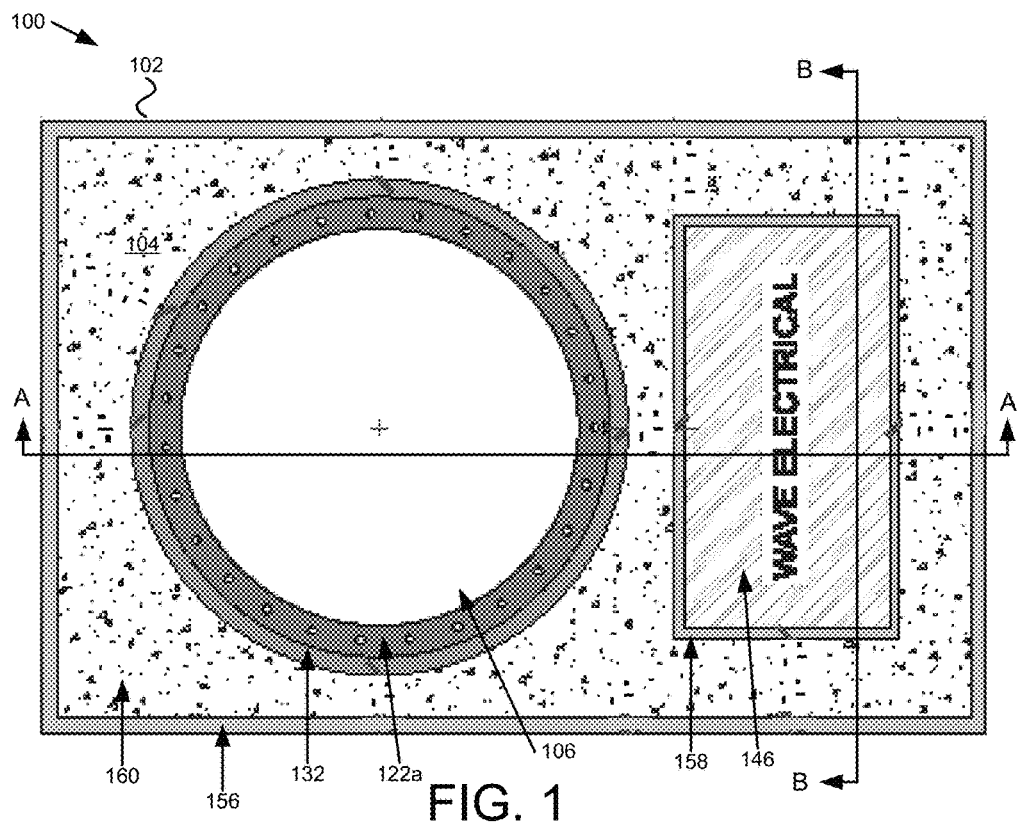
FIG. 1 is a plan view illustrating one embodiment of a removable pad apparatus for a wireless power transfer ("WPT") system in accordance with one embodiment of the present invention.
Figure 2:
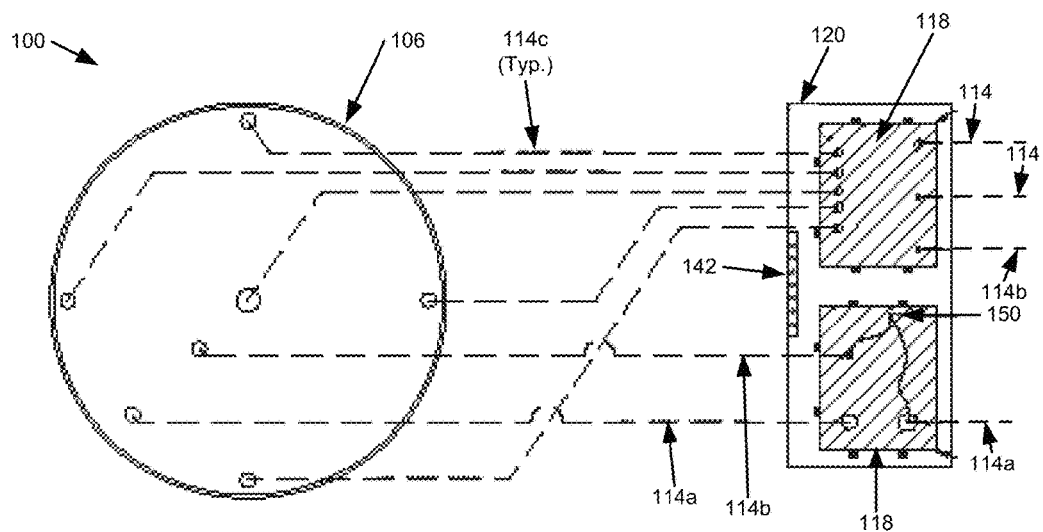
FIG. 2 is a schematic block diagram illustrating one embodiment of routing of sensor wiring from the removable pad to junction boxes of the removable pad apparatus in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or apparatus. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
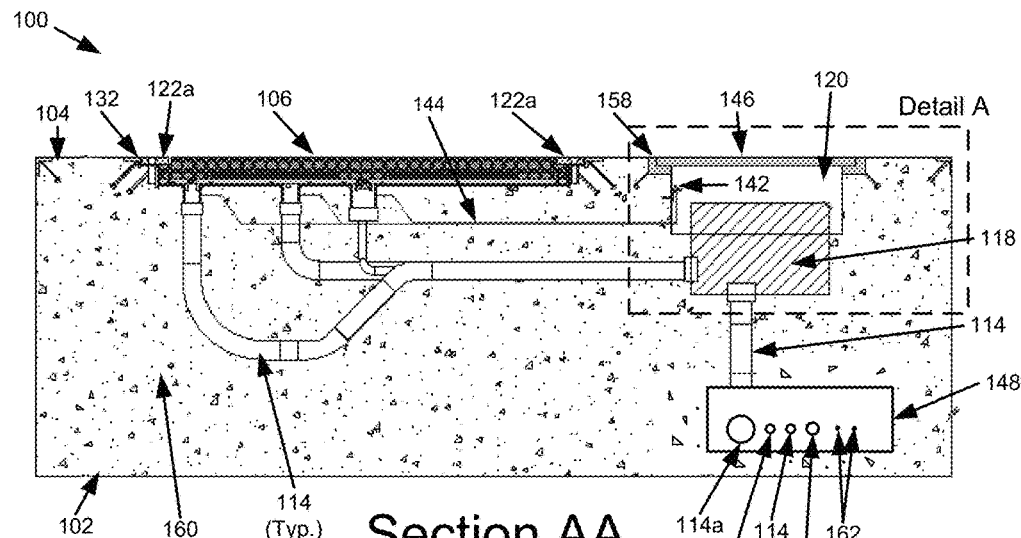
FIG. 3 is a section view AA illustrating one embodiment of the removable pad apparatus in accordance with one embodiment of the present invention.
Figure 4:
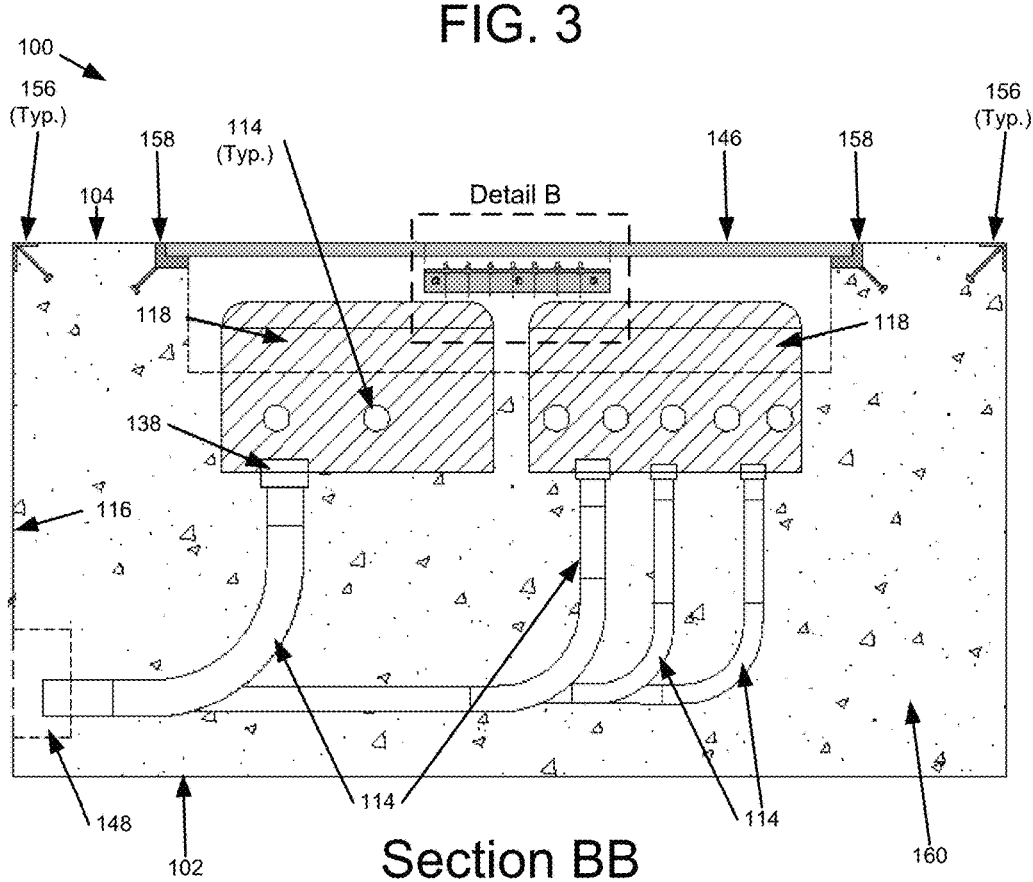
FIG. 4 is a section view BB illustrating one embodiment of the removable pad apparatus in accordance with one embodiment of the present invention.
Figure 5:
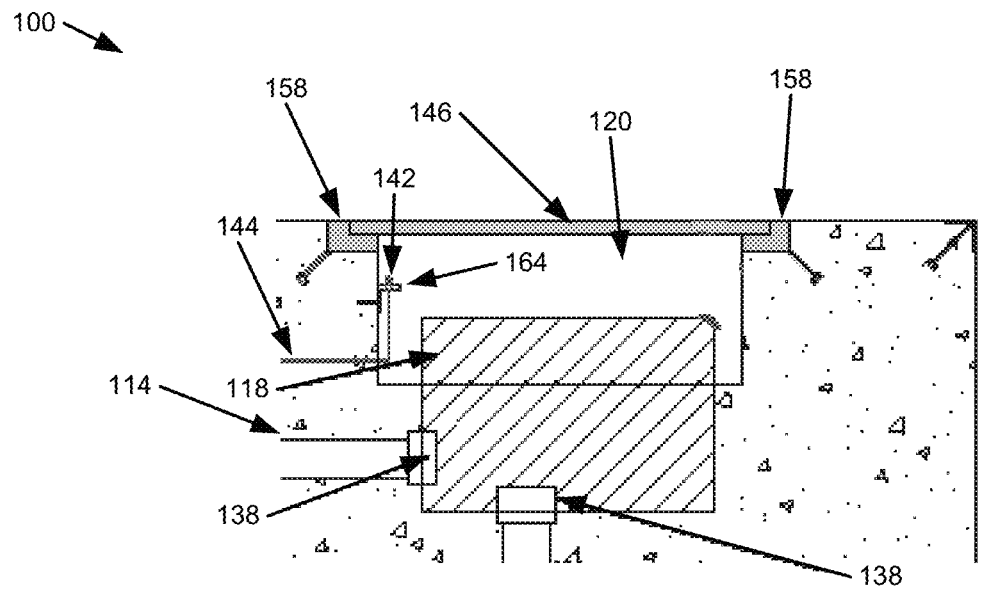
FIG. 5 is an enlarged view of Detail A on FIG. 3.
Figure 6:
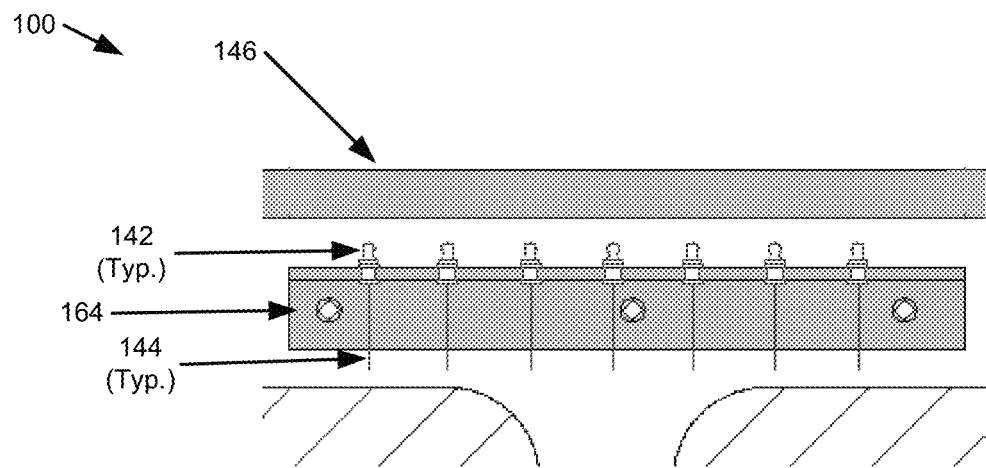
FIG. 6 is an enlarged view of Detail B on FIG. 4.
Figure 7:
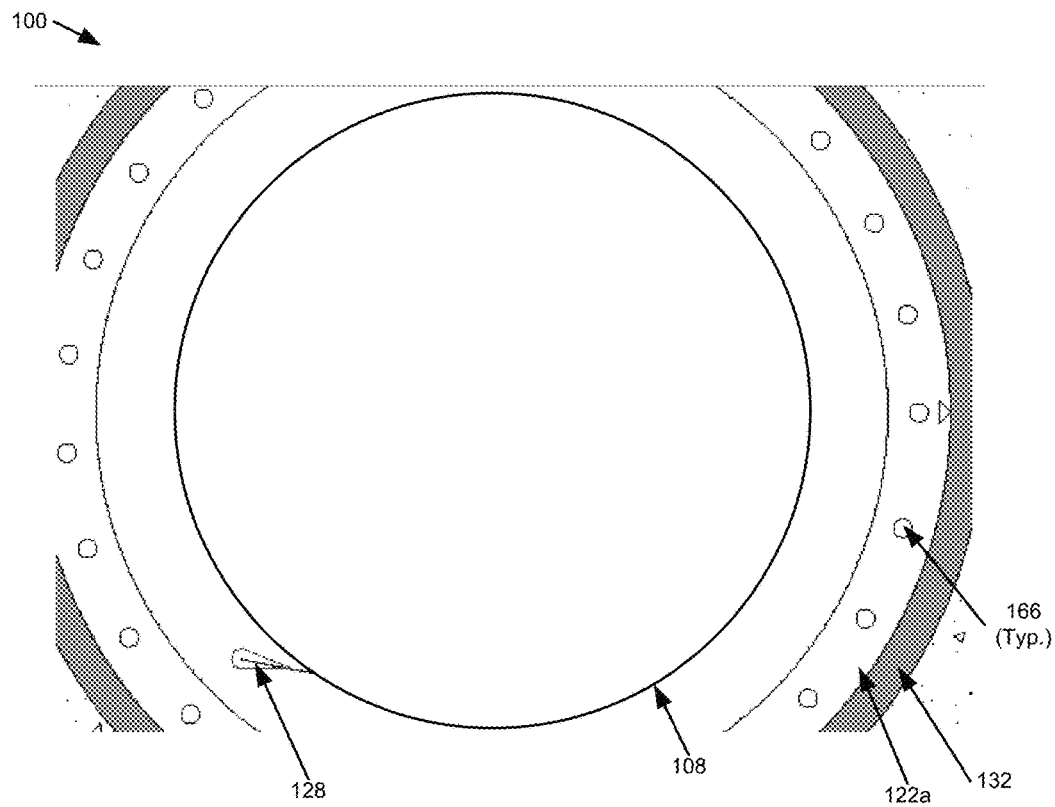
FIG. 7 is a plan view of a portion of the removable pad and a frame.
Figure 8:
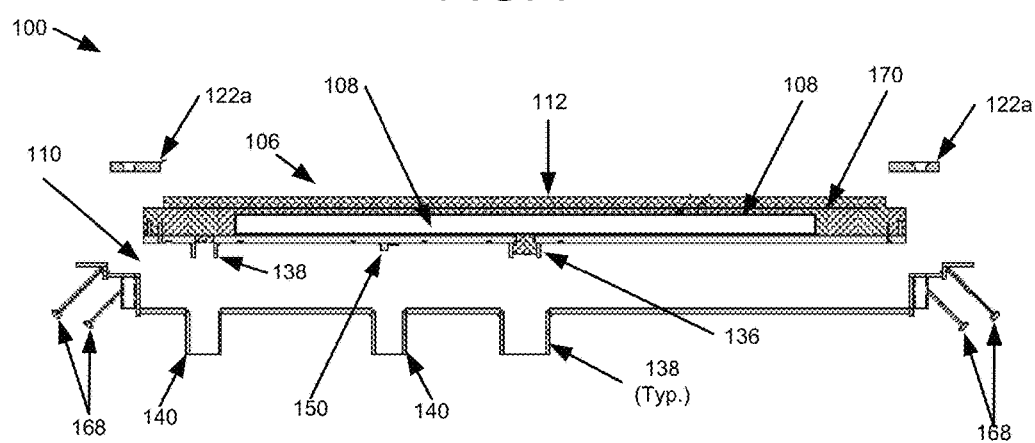
FIG. 8 is a section view of a frame for the removable pad, the removable pad, and a locking ring with the removable pad and locking ring removed from the frame.
Figure 9:
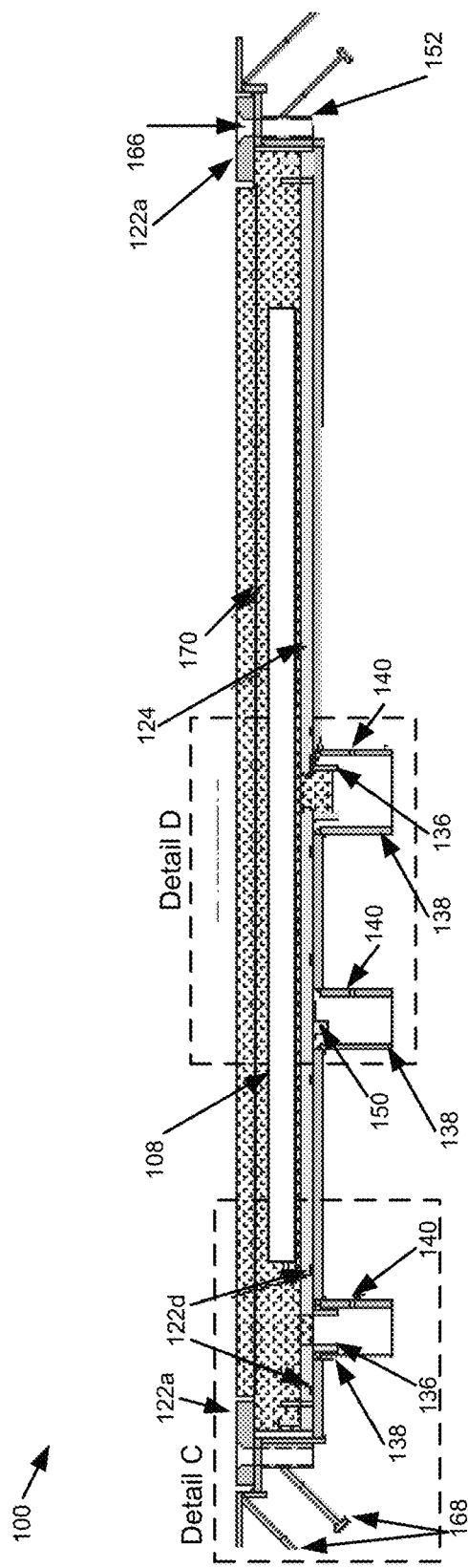
FIG. 9 is a section view of a frame for the removable pad, the removable pad, and a locking ring with the removable pad and locking ring connected to the frame.

FIG. 1 is a plan view illustrating one embodiment of a removable pad apparatus 100 for a wireless power transfer ("WPT") system in accordance with one embodiment of the present invention. FIG. 3 is a section view AA illustrating one embodiment of the removable pad apparatus 100 and FIG. 4 is a section view BB illustrating one embodiment of the removable pad apparatus 100. FIG. 5 is an enlarged view of Detail A on FIG. 3 and FIG. 6 is an enlarged view of Detail B on FIG. 4. A WPT system transfers power wirelessly typically from one pad to another pad. A pad, as used herein, is a device configured to direct an electromagnetic field to couple with another receiver pad so that power is transmitted from a transmitter pad to a receiver pad across a gap, such as an air gap. The WPT system typically includes pads with wiring positioned as windings around or adjacent to one or more ferrite elements in what may be referred to as a loosely coupled transformer. The WPT system, in one embodiment, is for transferring power to a vehicle where the vehicle has a receiver pad coupled to power conditioning equipment that transfers power to a load, such as a motor, or to a battery or other energy storage element.

The removable pad apparatus 100 includes a frame 102 with a removable pad 106. The frame 102 includes an opening 110 in a top surface 104 of the frame 102. The opening 110 may be a first opening 110 where there is also a second opening 120 for junction boxes 118. The removable pad 106 includes an inductive power transfer ("IPT") pad 108 embedded in the removable pad 106. The IPT pad 108 is shaped to transmit power to a receiver pad positioned above the removable pad 106. The removable pad 106 is sized to conform to the first opening 110 in the frame 102, where the first opening 110 of the frame 102 is shaped to support the removable pad 106. In one embodiment, the removable pad 106 and the first opening 110 are sized so that a top surface 104 of the removable pad 106 is substantially level with the top surface 104 of the frame 102.

Substantially level, as used herein, means that a top surface 112 of the removable pad 106 and the top surface 104 of the frame 102 are level or are close to being level, e.g. close to the same elevation, where the top surface 112 of the removable pad 106 may be slightly higher or slightly lower with respect to the top surface 104 of the frame 102. For example, variations in elevation between so that a top surface 104 of the removable pad 106 and the top surface 104 of the frame 102 may vary by a tenth of an inch, a half inch, or even an inch or other difference acceptable for vehicular traffic. In one embodiment, the top surface 112 of the removable pad 106 is higher than the top surface 104 of the frame 102 to allow asphalt or other roadway substance to be placed over the top surface 104 of the frame 102.

In one embodiment, when the frame 102 is located in a roadway, the frame 102 and removable pad 106 mounted in the first opening 110 of the frame 102 are rated for vehicular traffic to drive over the frame 102 and the removable pad 106 without damaging the frame 102 or the removable pad 106. For example, the rating for vehicular traffic may be an American Association of State Highway and Transportation Officials ("AASHTO") H-20 rating for heavy duty vehicular traffic, or an equivalent standard from another country for vehicular traffic in that country. The AASHTO H-20 rating, in one embodiment, is a full traffic H-20 rating for use in streets where vehicular traffic is constant. The full traffic H-20 rating differs from an "incidental" traffic rating, which is a lower standard where the incidental rating is for off-street, sidewalk, and low speed non-impact traffic areas of parking lots, etc. An incidental rating typically is designed to bear the weight of a non-moving load but is engineered without an impact factor. The full traffic H-20 rating is designed both for the weight of vehicular traffic and for the impact of the vehicular traffic moving at full speed.

In various embodiments, the removable pad 106 maintains structural integrity and performance of the IPT pad 108 while operating to transmit power under various loading conditions while maintaining the H-20 rating. For example, the removable pad 106 may withstand various climatic conditions, such as rain, snow, low humidity, high temperature, low temperature, and the like while maintaining the H-20 rating and while the IPT pad 108 transmits power or is inactive.

The removable pad 106 is configured to be removable so that the removable pad 106 may be readily replaced. As used herein, the term "removable" with respect to removable pad 106 means that the removable pad 106 may be removed and replaced without demolition or destruction of the frame 102 or an installed removable pad 106. For example, the removable pad 106 may be held in place with a locking ring, such as the locking ring 122a depicted in FIGS. 1, 3, 7, and 8-10 and one or more coupling mechanisms 166 so that the removable pad 106 may be replaced by removing the locking ring 122a and coupling mechanisms 166 and replaced where the locking ring 122a and coupling mechanisms 166. The removable pad 106 may also be made to be removable using other means to secure the removable pad 106 between replacements. For example, the removable pad 106 may be sealed to the frame 102 using a resin, an adhesive, or other material in a gap between the removable pad 106 and the frame 102 where just the resin, adhesive, etc. is destroyed to free the removable pad 106 for replacement without destruction of the frame 102. The removable pad 106 is typically constructed to be replaced while the frame 102 remains. One of skill in the art will recognize other designs and means to remove and replace the removable pad 106 without destruction or demolition of the frame 102 to a significant degree.

In one embodiment, the removable pad 106 includes a removable pad material and the IPT pad 108 is embedded in the removable pad material. In one example, the removable pad material is a polymeric matrix. The polymeric matrix may include some type of synthetic polymer and formed to have a structural integrity capable of achieving the AASHTO H-20 rating under a variety of climatic conditions while the IPT pad 108 transmits power or is inactive. For example, the climatic conditions may vary from −20 degrees Fahrenheit ("F") to 130 degrees F. (−29 degrees Celsius ("C") to 54 degrees C.), a humidity from 0 percent to 100 percent, as well as various exposures to the sun. The removable pad material may include any material that may surround the IPT pad 108 while complying with the H-20 requirements for various climactic conditions that may be encountered.

In one embodiment, the removable pad material is a foam. The foam may be a foam with voids filled with a gas or may be a syntactic foam. The syntactic foam, in one example, includes a resin and an aggregate. Typically the aggregate provides voids within the resign instead of voids filled with a gas. The aggregate may be of various materials and shapes. For example, the aggregate may include one or more of glass particles, ceramic particles, nano particles, plastic particles, fiberglass fibers, and the like. The particles may be specific shapes, such as spheres, beads, etc. or may be of random shapes. Typically the aggregate is sized to create a structure within the resin that increases strength of the resin. The aggregate may be typically between a minimum and a maximum size and one of skill in the art will recognize how to choose a size of the aggregate to increase and/or maximize strength of the syntactic foam.

The resin, in various embodiments, may include a vinylester, a polyester resin, a polyacrylamide, and an epoxy. In other embodiments, the resin may be a thermoplastic or a thermosetting resin. For example, a thermoplastic resin may be melted to form a shape and then hardened. In another example, a thermosetting material is formed through a chemical reaction in situ.

In one embodiment, the removable pad 106 includes fiber particles in the removable pad material. The fiber particles, in one embodiment, are loose fibers added to the foam or other material used to construct the removable pad 106. The fiber particles, in one embodiment, are fiberglass fibers. For example, the fiberglass fibers are loose fibers and may have various lengths and diameters. For example, the fiberglass fibers may be spun glass, silica glass fibers, etc., and may be 1-2 millimeters ("mm") and may have a diameter of 50-80 microns. The fiber particles typically help to reduce expansion and contraction and strengthen the removable pad 106.

In the removable pad apparatus 100 of FIG. 1, the frame 102 includes a second opening 120 with a cover 146 for the second opening 120. The frame 102, in various embodiments, may also include a frame edge 132 for the first opening 110, a frame edge 158 for the second opening 120, and an outer frame edge 156. The frame edge 132 for the first opening 110 is sized to accommodate the removable pad 106 and typically supports and holds in position the removable pad 106. The frame edge 132 for the first opening 110 may be steel, concrete or other rigid material that allows load from the removable pad 106 to be transferred to the frame 102 in meeting the AASHTO H-20 requirements. The frame edge 158 for the second opening 120 may be similar to the frame edge 132 for the first opening 110. The outer frame edge 156 may be of the same material as the other frame edges 132, 158 or may simply be a corner of the material used for the frame 102.

The frame 102, in one embodiment, is concrete 160, which includes an aggregate as indicated. The frame 102 may be concrete, a syntactic foam, or other material the meets the AASHTO H-20 rating while having an ability to be formed as needed to accommodate the removable pad 106 and other structures depicted in the drawings.

In one embodiment, the removable pad apparatus 100 includes one or more wire vias 114 extending from a bottom 126 of the removable pad 106 positioned within the first opening 110 to an exterior edge 116 of the frame 102. The bottom of the removable pad 106 is distal to the top surface 112 of the removable pad 106. The one or more wire vias 114 are sized for wiring extending from the removable pad 106 to at least the exterior edge 116 of the frame 102 and/or to electrical devices within the frame 102. In one embodiment, the wire vias 114 extend through the frame 102 the exterior edge 116 of the frame 102 and possibly beyond. For example, the frame 102 may terminate in a junction box or other device. In another embodiment, the wire vias 114 extend past the exterior edge 116 of the frame 102 to a junction box, electrical enclosure and/or device. For example, the device may include electronics that are part of the WPT system and may condition power to the removable pad 106. In one embodiment, the electrical enclosure and/or device may be located a distance away from the removable pad apparatus 100. For example, the removable pad apparatus 100 may be in a roadway and electronics for the removable pad 106 may be to the side of the roadway and may even be beyond a sidewalk adjacent to the roadway. The wire vias 114 may be 5 feet to 100 feet or more in length and wiring from the removable pad 106 may be longer than the wire vias 114.

In another embodiment, the removable pad apparatus 100 includes one or more junction boxes 118 positioned under a second opening 120 in the frame 102. The junction boxes 118, in one embodiment, may serve as pull boxes for wiring to the removable pad 106. In another embodiment, the one or more junction boxes 118 may include terminal strips or other places to land wiring from the removable pad 106 or may include other electronic components, such as foreign object detection equipment. For example, a grounding conductor may extend from the removable pad 106, from the frame 102, etc. to a grounding lug 150 and wire from the grounding lug 150 may then extend through a wire via 114b to or beyond the exterior edge 116 of the frame 102 to that the removable pad apparatus 100 may be properly grounded. In another embodiment, the grounding conductors (i.e. 162) may just extend through the frame 102 without a wire via 114.

In other embodiments, wiring from the removable pad 106 may terminate in one or more electrical devices within a junction box 118. In another embodiment, wiring from the removable pad 106, such as wiring from the IPT pad 108, may extend through a junction box 118 to wire vias 114a for IPT pad conductors, which may extend to electrical equipment beyond the frame 102. In another embodiment, a junction box 118 in the frame 102 is large enough to accommodate the electrical equipment connected to the IPT pad 108.

In one embodiment, the removable pad apparatus 100 includes a bottom plate 124 of the removable pad 106. A bottom surface 126 of the bottom plate 124 is a bottom of the removable pad 106 and the IPT pad 108 is positioned within the removable pad material and the bottom plate 124 is between the IPT pad 108 and the bottom of the removable pad 106. In one embodiment, the bottom plate 124 is positioned to shield electromagnetic waves from the frame 102, which may improve efficiency. For example, the bottom plate 124 may be constructed of a material useful for electromagnetic shielding and in one embodiment, is a material that does not include a ferrite. In various embodiments, the bottom plate 124 includes aluminum, stainless steel, copper, etc. Where the bottom plate 124 is aluminum, in one embodiment, the bottom plate 124 is primarily aluminum.

As used herein, primarily aluminum means that the bottom plate 124 is mostly aluminum but may include small portions of other materials. In one embodiment, the bottom plate 124 includes small amounts of another metal or material mixed with the aluminum so that the aluminum is an aluminum alloy. In another embodiment, primarily aluminum may also mean that the bottom plate 124 may include other parts, such as screws, couplers 138, etc. that are not aluminum. In another embodiment, the bottom plate 124 may include another covering, such as a composite material and may be considered primarily aluminum where the shielding properties of the aluminum in the bottom plate 124 are suitable for the electromagnetic field generated by the IPT pad 108. One of skill in the art will recognize other embodiments where the bottom plate 124 is primarily aluminum. In addition, use of the word "primarily" may be combined with other materials, such as stainless steel so that the bottom plate 124 is primarily stainless steel and the definition of "primarily" described above applies.

In one embodiment, the bottom plate 124 is sized with respect to an expected gap or air gap to maximize or increase efficiency. For example, a ratio of the size of the bottom plate 124 to the size of the gap may be a certain distance where the gap is between the ferrimagnetic component of the IPT pad 108 and a receiver pad of a device where power is transferred. Discussion of the ratio is included in U.S. Patent Publication No. 20130088090, titled WIRELESS POWER TRANSFER MAGNETIC COUPLERS, to Hunter Wu, et al., filed Oct. 9, 2012, which is incorporated herein by reference for all purposes.

In one embodiment, the bottom of the first opening 110 includes a metal plate 134, where the bottom plate 124 of the removable pad 106 is flush with the metal plate 134 and in contact with the metal plate 134 when the removable pad 106 is positioned in the first opening 110. In other embodiments, the metal plate 134 may be made of another material, such as fiberglass, a composite, concrete, etc. For example, where the bottom plate 124 of the removable pad 106 is in contact with the metal plate 134 of the frame 102, forces on the removable pad 106 may be transferred to the metal plate 134 of the frame 102 and then to the frame 102 so that the removable pad 106 is supported by the frame 102 in a way that the removable pad apparatus 100 meets the AASHTO H-20 requirements.

In one embodiment, the bottom plate 124 includes one or more openings coincident with the one or more wire vias 114 positioned in the frame 102. FIGS. 3 and 8-11 show openings in the bottom plate 124 for wire vias 114 positioned in the frame 102. For example, an opening in the bottom plate 124 may be an opening aligned with a wire via 114a for conductors of the IPT pad 108. In another embodiment, the opening may also have a coupling device 136, such as a cylinder attached to the opening. The frame 102 may include a coupler 138. In the embodiment shown in FIG. 10, the frame 102 includes a metal plate 134 with an attached coupler 138 coincident with the coupling device 136 of the bottom plate 124. In addition, the coupler 138 includes a wider portion that may accommodate a wire via 114a for the conductors of the IPT pad 108. A wire via 114, in various embodiments, includes a conduit, such as rigid conduit, polyvinyl chloride ("PVC") conduit, etc. A wire via 114 may also include other channels within the frame 102, such as a junction box, a block out, or any other path for conductors.

Figure 11:
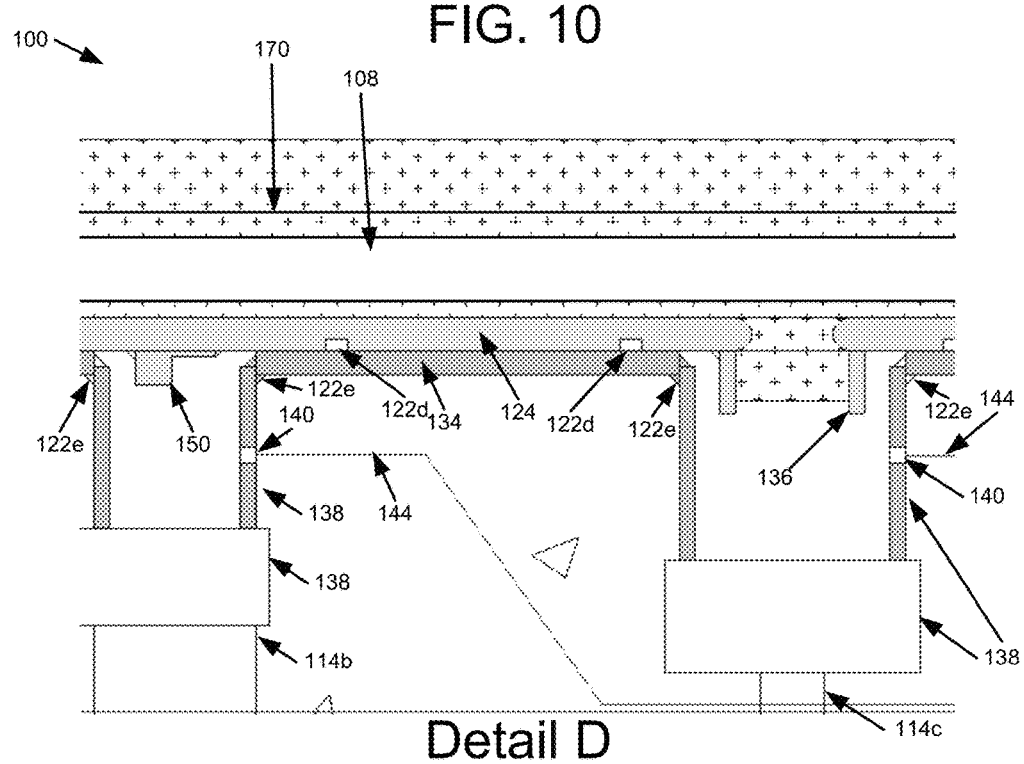
FIG. 11 is an enlarged view of Detail D from FIG. 9.

In another embodiment, the bottom plate 124 includes a grounding lug 150 coincident with one or more wire vias 114b for grounding conductors for the IPT pad 108, as depicted in FIG. 11. The bottom plate 124 may also include a coupling device 136 attached to the grounding lug 150 and aligned with the grounding lug 150. The frame 102 may include a coupler 138 aligned with the coupling device 136 for the grounding lug 150 of the removable pad 106. In another embodiment, the bottom plate 124 may include an opening for grounding conductors from the IPT pad 108 or other parts of the removable pad 106, and the opening may be adjacent to the grounding lug 150 or may be in a different location with a separate coupling device 136 aligned with a coupler 138 of the frame 102.

In another embodiment, the bottom plate 124 includes an opening coincident with a wire via 114c for other wiring, such as for foreign object detection ("FOD"). As with an opening in the bottom plate 124 for conductors for the IPT pad 108, the opening(s) in the bottom plate 124 for other wiring may also include a coupling device 136 connected to the bottom plate 124 which are coincident with couplers 138 and wire vias 114c in the frame 102. For example, the removable pad 106 may have coils or other electronics for foreign object detection and wiring may pass through openings in the bottom plate 124 to the wire vias 114 in the frame 102.

In one embodiment, the removable pad 106 includes one or more components for foreign object detection 170, which is depicted in FIGS. 8-11 as a line. A foreign object detection system may include a foreign object detection component 170 that may include one or more coils, a printed circuit board, ferrite material, sensors, or other foreign object detection component 170. The foreign object detection system may detect some object in or around the gap between the removable pad 106 and a receiver pad in a vehicle. For example, a person or animal may move beneath a vehicle during charging and the foreign object detection system may detect the person or animal and may then disable charging for safety reasons. In other instances, some other foreign object may be present, such as a piece of metal or other object that may disrupt charging or may be affected by the charging.

In one embodiment, the removable pad 106 include the foreign object detection component 170 embedded therein. In another embodiment, the foreign object detection component 170 may be above or below the removable pad 106. In another embodiment, the foreign object detection component 170 is removably embedded within the removable pad 106 or frame 102, for example, within a compartment within the removable pad 106 or frame 102. One of skill in the art will recognize other ways to implement a foreign object detection system and ways to include a foreign object detection component 170 in or around the removable pad 106

In one embodiment, the wire vias 114 terminate in one or more junction boxes 118, as shown in FIGS. 2-5. In one embodiment, some or all of the wire vias 114 exit the junction boxes 118 and continue out of the frame 102. In one example, the wire vias 114 terminate at a block out 148 in the material of the frame 102 where the wire vias 114 are exposed for connection to other wire vias (i.e. conduit, etc.) running to other parts of the WPT system. For example, the wire vias 114 in the block out 148 may terminate in female connectors suitable for connection to conduit or other wire vias running to other parts of the WPT system. In other embodiments, the wire vias 114 (e.g. 114c) terminate in a junction box 118 and the junction box 118 may include other electronics, such as parts of a foreign object detection system.

In one embodiment, the removable pad apparatus 100 includes one or more sealing mechanisms 122 that secure the removable pad 106 to the frame 102 and inhibit liquid from entering the one or more wire vias 114. For example, the removable pad apparatus 100 may include one or more o-rings 122d mounted between the removable pad 106 and the bottom of the first opening 110 in the frame 102, where at least one o-ring 122d surrounds each of the one or more wire vias 114 and inhibits liquid from the top surfaces 104, 112 of the frame 102 and removable pad 106 from reaching the one or more wire vias 114 when the removable pad 106 is mounted in the first opening 110 of the frame 102. For example, the o-rings 122d may be compressed to form a seal between the bottom surface 126 of the bottom plate 124 of the removable pad 106 and the metal plate 134.

In another embodiment, the one or more sealing mechanisms 122 may include a locking ring 122a positioned around a perimeter of the top surface 112 of the removable pad 106 and one or more coupling mechanisms 166 that couple the locking ring 122a to the frame 102. In one embodiment, the locking ring 122a exerts a downward force on the removable pad 106 to secure the removable pad 106 in the first opening 110 when the coupling mechanisms 166 couple the locking ring 122a to the frame 102. In one embodiment, the coupling mechanisms 166 are bolts or screws and the frame 102 includes threaded holes to receive the bolts or screws. Other coupling mechanisms 166 may include rivets, rods, latches, toggle bolts, and the like. The coupling mechanisms 166 may include any type of coupler that applies a force to the locking ring 122a so that the locking ring 122a holds the removable pad 106 in place. Other possible designs may include a removable pad 106 held in place directly using the coupling mechanisms 166 without the locking ring 122a.

In one embodiment, the one or more sealing mechanisms 122 may include a seal 122b positioned within a gap between sides of the removable pad 106 and sides of the first opening 110. The seal 122b, in one embodiment, fills the gap to inhibit liquid from the top surfaces 104, 112 of the frame 102 and removable pad 106 from reaching the bottom of the opening 110 and the bottom of the removable pad 106 when the removable pad 106 is mounted in the opening 110 of the frame 102.

In another embodiment, the one or more sealing mechanisms 122 may include a seal 122c positioned within a gap between sides of the removable pad 106 and the locking ring 122a and may also include a seal 122c positioned within a gap between sides of the frame 102 and the locking ring 122a. The seal(s) 122c fill the gap(s) to inhibit liquid from top surfaces of the removable pad apparatus 100 from reaching the bottom of the opening 110 and the bottom 126 of the removable pad 106 when the removable pad 106 is mounted in the opening 110 of the frame 102.

In one embodiment, one or more of the seals 122b, 122c extend to the top of each respective gap. In another embodiment, the seals 122b, 122c may be made of a flexible material to allow for expansion and contraction of the removable pad 106, locking ring 122a, and/or the frame 102. For example, material used in the seals 122b, 122c may include a rubber, such as natural rubber, a silicone rubber, and the like, nylon, PVC, polyester, nitrile, polyurethane, and the like. The seals 122b, 122c may expand and contract to maintain a seal between sides of the removable pad 106 and sides of the first opening 110. One of skill in the art will recognize other ways of sealing gaps between the frame 102, the locking ring 122a, and the removable pad 106.

In another embodiment, the one or more sealing mechanisms 122 may include a dielectric grease 122f that fills a space surrounding wiring within each of the one or more wire vias 114. For example, the removable pad apparatus 100 may include a dielectric grease port 140 within the wire vias 114, the coupling device(s) 136, the couplers 138 or other convenient location and conduit 144 for the dielectric grease 122f connected to each port and one or more grease zerks 142 to allow filling space surrounding wiring with dielectric grease 122f. For example, FIGS. 2, 3, 5, 6, 10 and 11 include one embodiment of a dielectric grease port 140, conduit 144, and grease zerks 142 to push dielectric grease 122f to surround the wiring. One of skill in the art will recognize other ways to supply dielectric grease 122f to locations to seal around wiring of the removable pad apparatus 100.

Figure 10:
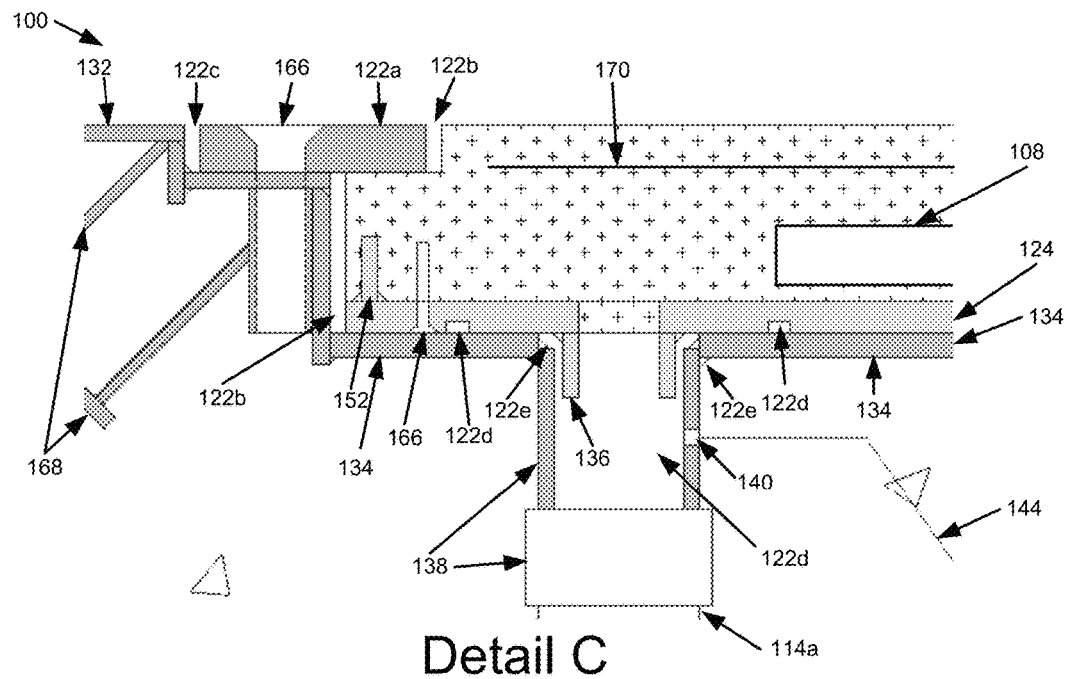
FIG. 10 is an enlarged view of Detail C from FIG. 9.

In one embodiment, the removable pad 106 includes at least one coupling device 136 connected to the bottom plate 124 of the removable pad 106 and extending into a wire via 114 where the one or more wire vias 114 where the one or more sealing mechanisms 122 include a seal 122e positioned within a gap between the coupling device 136 and the wire via 114. The seal 122e fills the gap to inhibit liquid from the top surfaces 104, 112 of the frame 102 and removable pad 106 from reaching the wire via 114. In one example, the wire vias 114 include couplers 138 as depicted in FIGS. 8-11 that may aid in construction of the removable pad apparatus 100. FIGS. 10 and 11 depict one embodiment of the seal 122e between the coupling devices 136 and couplers 138 of the wire vias 114. The seal 122e may be in the form of a gasket, o-ring or other sealing structure and may be made of rubber, silicone or material described above in relation to other seals 122b, 122c. One of skill in the art will recognize other designs and materials suitable for preventing liquid from entering space around the wiring of the removable pad 106.

In one embodiment, the removable pad apparatus 100 includes a second opening 120 in the top surface 104 of the frame 102 and a cover 146 for the second opening 120. In one embodiment, the second opening 120 is positioned adjacent to the first opening 110 and the cover 146 is sized to conform to the second opening 120. In another embodiment, the second opening 120 of the frame 102 is shaped to support the cover 146 and the cover 146 and the second opening 120 are sized so that a top surface of the cover 146 is substantially level with the top surface 104 of the frame 102. The cover 146 and top surface 104 of the frame 102 may be level or the cover 146 may be a little higher or lower than the top surface 104 of the frame 102.

The frame 102 with the cover 146 mounted in the second opening 120 of the frame 102 are rated for vehicular traffic to drive over the cover 146 without damaging the frame 102 or the cover 146. In one embodiment, the frame 102 and the cover 146 mounted in the frame 102 comply with the AASHTO H-20 vehicular traffic rating. The second opening 120 includes one or more junction boxes 118 positioned within the wire vias 114 and/or one or more electrical devices (not shown). Typically, the junction boxes 118 are positioned in the second opening 120 to inhibit liquid from entering the junction boxes 118. For example, the junction boxes 118 may be raised with respect to a bottom of the second opening 120. The junction boxes 118 may also include one or more seals to inhibit liquid from entering the junction boxes 118. For example, the junction boxes 118 may have a National Electrical Manufacturers Association ("NEMA") 4 or 4× rating or similar rating such that the junction boxes 118 are watertight when the cover is secured to the junction box 118.

In one embodiment, one or more of the junction boxes 118 are positioned in one or more of the wire vias 114 and one or more of the junction boxes 118 are size for pulling wire from the removable pad 106 and to a location connected by conduit to the wire vias 114. For example, wiring from the removable pad 106 may be continuous from the removable pad 106 to a device that is part of the WPT system and is remote from the removable pad apparatus 100 and a junction box 118 used as a pull box may aid in pulling wire to the device. In another embodiment, one or more of the junction boxes 118 are size for connectors that connect wiring from the removable pad 106 to wiring extending to the location connected by conduit to the wire vias 114. For example, wiring from the removable pad 106 may terminate in a junction box 118, for example on a terminal strip, and additional wiring from a device remote from the IPT pad 108 may also terminate on the terminal strip. In another embodiment, wiring from the removable pad 106 may connect directly to wiring to a device remote from the IPT pad 108 in a junction box 118. Thus, wiring from the removable pad 106 may be shorter than a removable pad 106 with wiring that runs all the way to the device external to the removable pad apparatus 100.

In another embodiment, one or more electrical devices are positioned in the second opening 120 and mounted in an enclosure, such as a junction box 118, positioned in the second opening 120 to prevent liquid from entering the one or more electrical devices. In another embodiment, one or more electrical devices are connected to the removable pad 106 by wire running in the one or more wire vias 114, where the one or more electrical devices support wireless charging using the removable pad 106. For example, the one or more electrical devices may be part of a resonant inverter of the WPT system or other electronic device, such as electronics for foreign object detection.

In one embodiment, the removable pad apparatus 100 includes two or more removable pads 106. In one embodiment, two or more removable pads 106 are stacked in the first opening 110. In another embodiment, the removable pad apparatus 100 includes two or more first openings 110 and each removable pad 106 is located in a first opening 110. Wiring from the two or more removable pads 106 may be routed separately through wire vias 114 to one or more junction boxes 118 or to the exterior edge 116 of the frame 102 for connection to one or more conduits or other wire ways. In one embodiment, the two or more removable pads 106 may work together for charging.

In another embodiment, the two or more removable pads 106 are energized separately for charging. For example, each removable pad 106 may be for a different vehicle, such as a bus, a truck, a car, etc. and may be tuned or adjusted for a specific vehicle or vehicle category or type. In another embodiment, the removable pads 106 are designed same or similar outer dimensions so that that a removable pad 106 suitable for a particular location may be installed. For example, a frame 102 may be located at a bus stop in a roadway along a bus route and an identical frame 102 may be installed in a parking lot or other location where cars will be parked or will stop and a removable pad 106 suitable for cars may be installed. In another embodiment, multiple removable pads 106 may be installed in a single frame 102 or in separate frames 102 and may have common conduit or other wire way that extends back to a common location with other WPT system components. In one example, the frames 102 include a wire way that aligns in a certain dimension where frames 102 are placed side-by-side.

In one embodiment, the IPT pad 108 and/or the bottom plate 124 are detachable from the removable pad 106 and may be replaced. For example, the bottom plate 124 may be attached using screws, bolts, or other fasteners to the removable pad material and/or the IPT pad 108 and may be replaced. The bottom plate 124, for example, may be sized for a particular charging power level and may be replaced where the power requirements vary. In another embodiment, the IPT pad 108 is replaceable. For example, a particular IPT pad 108 may be sized for a particular power level, such as 50 kilowatts ("kW") and may be replaced with a different IPT pad 108 sized for 200 kW of charging. The bottom plate 124 may also be replaced for a change in charging power level.

Figure 12:
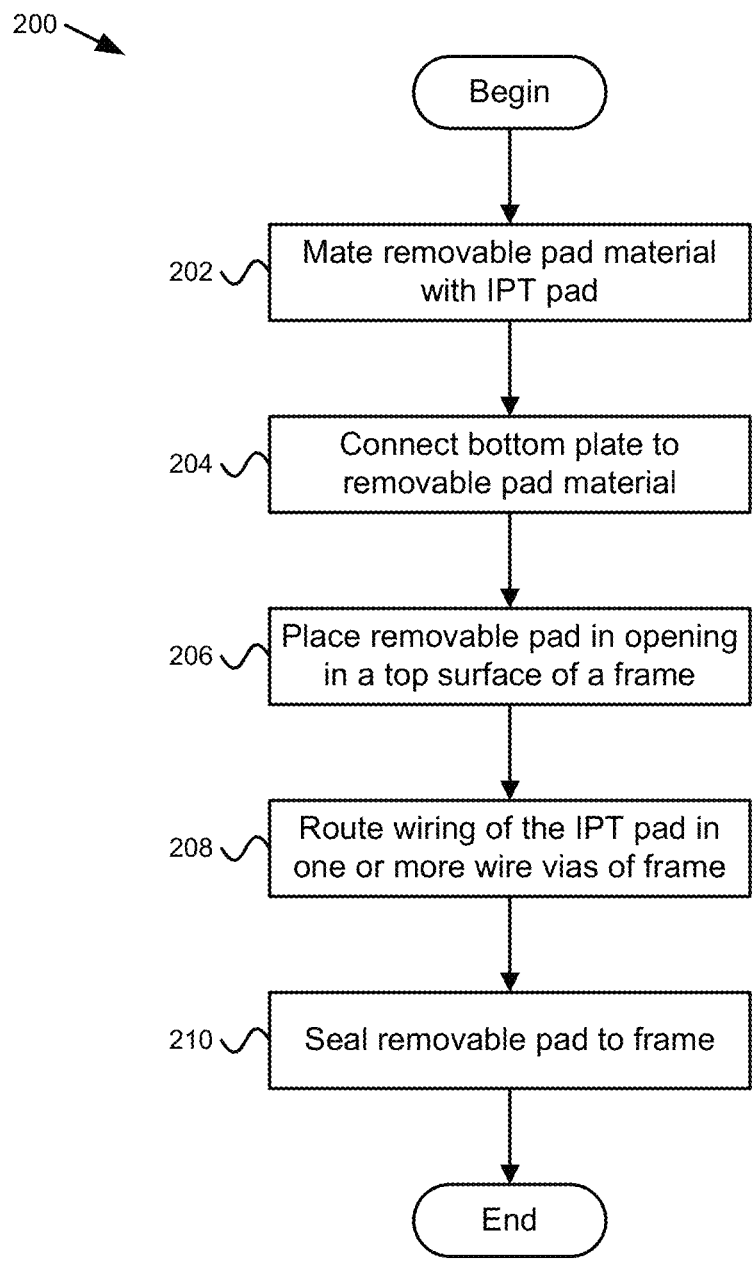
FIG. 12 is a schematic flow chart diagram for one embodiment of a method for creating a removable pad.

FIG. 12 is a schematic flow chart diagram for one embodiment of a method 200 for creating a removable pad 106. The method 200 begins by creating a removable pad 106. The removable pad 106, in one embodiment, is created by mating 202 a removable pad material with an IPT pad 108. The IPT pad 108 is shaped to transmit power to a receiver pad positioned above the removable pad 106 and the IPT pad 108 includes a ferrite and wiring. Creating the removable pad 106, in one embodiment, also includes connecting 204 a bottom plate 124 to the removable pad material of the removable pad 106. The bottom plate 124, in one embodiment, includes one or more openings for the wiring extending from the IPT pad 108, where the wiring extending through the one or more openings.

As discussed above, the removable pad material may be a polymeric matrix, have a structural integrity capable of achieving the AASHTO H-20 rating under a variety of climatic conditions while the IPT pad 108 transmits power or is inactive, and the like. The removable pad material may be a foam, such as a foam with voids filled with a gas or may be a syntactic foam, or other suitable material. In one embodiment, creating the removable pad 106 includes covering a top side and sides of the removable pad 106 with a fiberglass covering where the top side is distal to the bottom plate 124. For example, fiberglass may be placed around the sides of the removable pad material such that fibers encircle the removable pad 106. For example, the fiberglass may be woven. Fiberglass may also be placed across the top the removable pad material in various directions, and the fiberglass may be woven. In addition, fiberglass that is a spun glass may be placed on the top and/or sides of the removable pad material. The fiberglass, in one embodiment, includes several layers on the top and sides of the removable pad material. In one embodiment, the top of the removable pad 106 include an ultraviolet ("UV") veil to protect the removable pad 106 from sunlight.

In one embodiment, once the removable pad material is created and hardened, the removable pad material may be machined to accommodate the IPT pad 108. In one embodiment, grooves are milled into the removable pad material for wiring and for the ferrite or other materials, such as a substrate. In other embodiments, the removable pad material is machined to accommodate other electronics, windings, etc. For example, the removable pad material may be machined to accommodate a winding or detector for foreign object detection. In another embodiment, the removable pad 106 is created by forming the removable pad material around the IPT pad 108. For example, a mold may be formed around the IPT pad 108 and the removable pad material may be injected into the form.

In one embodiment, the removable pad 106 is created by connecting the bottom plate 124 to the removable pad material and IPT pad 108. For example, where the IPT pad 108 is placed in grooves and openings in the removable pad 106, resin or other adhesive may be placed in and around the grooves and IPT pad components and the bottom plate 124 may be placed in contact with the resin or adhesive. In one embodiment, a vacuum force is applied to remove air pockets from a junction between the removable pad material, the IPT pad 108, and the bottom plate 124. In another embodiment, a clamping force is applied to the bottom plate 124 and removable pad material to hold the removable pad 106 in place while the resin/adhesive dries. In another embodiment, the IPT pad 108 is place on or secured to the bottom plate 124 and the removable pad material is formed around the IPT pad 108 and to the bottom plate 124.

In one embodiment, the bottom plate 124 includes a retention ring 152 around the outer edge of the removable pad material. For example, the retention ring 152 may be welded, bolted, etc. to the bottom plate 124 and may server to retain the removable pad material and to restrain the removable pad material during expansion. In one embodiment, the removable pad material is milled to accommodate the retention ring 152 and is positioned a distance from the outer edge of the removable pad material and/or fiberglass attached to the removable pad material, as depicted in FIG. 10. In another embodiment, the retention ring 152 is external to the removable pad material and may match the height of the removable pad material or may be shorter than the removable pad material as depicted in FIG. 10.

The method 200, in one embodiment, includes placing 206 the removable pad 106 in an opening 110 in a top surface 104 of a frame 102, and routing 208 wiring of the IPT pad 108 in one or more wire vias 114 extending from a bottom 126 of the removable pad 106 positioned within the opening 110 to an exterior edge 116 of the frame 102. The method 200 includes sealing 210 the removable pad 106 to the frame 102 with one or more sealing mechanisms 122 that secure the removable pad 106 to the frame 102 and inhibit liquid from entering the one or more wire vias 114, and the method 200 ends.

In one embodiment, the frame 102 is mounted in a roadway for vehicular traffic. The opening 110 of the frame 102 is shaped to support the removable pad 106 and the removable pad 106 and the opening 110 are sized so that a top surface 112 of the removable pad 106 is substantially level with the top surface 104 of the frame 102. The bottom 126 of the removable pad 106 is distal to the top surface 112 of the removable pad 106. The one or more wire vias 114 are sized for the wiring and extend from the removable pad 106 to at least the exterior edge 116 of the frame 102 and/or electrical devices within the frame 102.

In one embodiment, when the frame 102 is located in a roadway, the frame 102 and removable pad 106 mounted in the opening 110 of the frame 102 are rated for motor vehicular traffic to drive over the frame 102 and the removable pad 106 without damaging the frame 102 or the removable pad 106.

In one embodiment, sealing 210 the removable pad 106 to the frame 102 includes coupling a locking ring 122a to the frame 102, where the locking ring 122a engages the removable pad 106. In one embodiment, the locking ring 122a is positioned around a perimeter of the top surface 112 of the removable pad 106 where the locking ring 122a exerts a downward force on the removable pad 106 to secure the removable pad 106 in the opening 110 when coupling mechanisms 166 couple the locking ring 122a to the frame 102. In another embodiment, sealing 210 the removable pad 106 to the frame 102 includes compressing one or more o-rings 122d mounted between the removable pad 106 and the bottom of the opening 110 in the frame 102, where at least one o-ring 122d surrounds each of the one or more wire vias 114 and inhibits liquid from the top surfaces 104, 112 of the frame 102 and removable pad 106 from reaching the one or more wire vias 114 when the removable pad 106 is mounted in the opening 110 of the frame 102.

In another embodiment, sealing 210 the removable pad 106 to the frame 102 includes placing a seal 122b within a gap between sides of the removable pad 106 and the locking ring 122a, where the seal 122b fills the gap to inhibit liquid from the top surfaces 104, 112 of the frame 102 and removable pad 106 from reaching the bottom of the opening 110 and the bottom 126 of the removable pad 106 when the removable pad 106 is mounted in the opening 110 of the frame 102. In another embodiment, sealing 210 the removable pad 106 to the frame 102 includes placing a seal 122c within a gap between sides of the removable pad 106 and sides of the opening 110, where the seal 122c fills the gap to inhibit liquid from the top surfaces 104, 112 of the frame 102 and removable pad 106 from reaching the bottom of the opening 110 and the bottom 126 of the removable pad 106 when the removable pad 106 is mounted in the opening 110 of the frame 102.

In another embodiment, sealing 210 the removable pad 106 to the frame 102 includes placing a seal 122e positioned within a gap between at least one coupling device 136 and the wire via 114, where the seal 122e fills the gap to inhibit liquid from the top surfaces 104, 112 of the frame 102 and removable pad 106 from reaching the wire via 114. The removable pad 106 includes the at least one coupling device 136 connected to the bottom 126 of the removable pad 106 and extending into a wire via 114 of the one or more wire vias 114. In another embodiment, sealing 210 the removable pad 106 to the frame 102 includes inserting a dielectric grease 122f that fills a space surrounding wiring within each of the one or more wire vias 114.

PARTS LIST

102 Frame
104 Top surface of the frame
106 Removable pad
108 IPT pad
110 Opening for the removable pad (first opening)
112 Top surface of the removable pad
114 Wire vias
114a Wire via for IPT pad conductors
114b Wire via for ground
114c Wire via for other electronics, such as foreign object detection ("FOD")
116 Exterior edge of frame (termination of wire vias)
118 Junction box
120 Opening for junction boxes (second opening)
122 Sealing mechanism
122a Locking ring
122b Seal between locking ring and removable pad
122c Seal between frame and removable pad
122d O-ring
122e Seal between coupler and frame
122f Dielectric grease
124 Bottom plate of removable pad
126 Bottom surface of bottom plate of removable pad
128 IPT pad wiring
132 Frame edge for first opening 134 Metal plate of frame
136 Coupling device
138 Coupler
140 Dielectric grease port
142 Grease zerk
144 Conduit for dielectric grease
146 Cover for second opening
148 Block out for wire vias
150 Grounding lug
152 Retention ring
154 Frame side
156 Frame outer edge
158 Frame edge for second opening
160 Concrete
162 Grounding conductors
164 Grease zerk support
166 Coupling mechanism
168 Frame edge anchor
170 Foreign object detection component The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a frame comprising an opening in a top surface of the frame;
   a removable pad with an inductive power transfer ("IPT") pad embedded therein, the IPT pad shaped to transmit power to a receiver pad positioned above the removable pad, the removable pad sized to conform to the opening, wherein the opening of the frame is shaped to support the removable pad and the removable pad and the opening are sized so that a top surface of the removable pad is substantially level with the top surface of the frame; and
   a locking ring positioned around a perimeter of the top surface of the removable pad and one or more coupling mechanisms that couple the locking ring to the frame, wherein the locking ring exerts a downward force on the removable pad to secure the removable pad in the opening when the coupling mechanisms couple the locking ring to the frame, wherein the frame and the removable pad are notched to accommodate the locking ring and a top surface of the locking ring flush with the top surface of the frame and the top surface of the pad, wherein, when the frame is located in a roadway, the top surface of the pad exposed to vehicular traffic, the frame, removable pad mounted in the opening of the frame and locking ring are rated for vehicular traffic to drive over one or more of the frame, the removable pad and locking ring without damaging the frame, the removable pad or locking ring.

2. The apparatus of claim 1, wherein the rating for vehicular traffic comprises an American Association of State Highway and Transportation Officials ("AASHTO") H-20 rating for heavy duty vehicular traffic.

3. The apparatus of claim 1, wherein the removable pad comprises a removable pad material and the IPT pad is embedded in the removable pad material.

4. The apparatus of claim 3, wherein the removable pad material comprises a polymeric matrix and the IPT pad is embedded in the polymeric matrix.

5. The apparatus of claim 3, wherein the removable pad material comprises a foam.

6. The apparatus of claim 5, wherein the foam comprises a syntactic foam, the syntactic foam comprising a resin and an aggregate.

7. The apparatus of claim 6, wherein the aggregate comprises one or more of glass particles, ceramic particles, nano particles, plastic particles, and fiberglass fibers.

8. The apparatus of claim 6, wherein the resin comprises one or more of a vinylester, a polyester resin, a polyacrylamide, and an epoxy.

9. The apparatus of claim 3, wherein at least one exterior layer of the removable pad material comprises fiberglass.

10. The apparatus of claim 1, further comprising:
    one or more wire vias extending from a bottom of the removable pad positioned within the opening to an exterior edge of the frame, the bottom of the removable pad distal to the top surface of the removable pad, the one or more wire vias sized for wiring extending from the removable pad to one or more of at least the exterior edge of the frame and electrical devices within the frame; and
    one or more sealing mechanisms that secure the removable pad to the frame and inhibit liquid from entering the one or more wire vias.

11. The apparatus of claim 10, wherein the removable pad comprises a removable pad material and the IPT pad is embedded in the removable pad material and wherein the removable pad comprises a bottom plate, a bottom surface of the bottom plate comprising a bottom of the removable pad wherein the IPT pad is positioned within the removable pad material and the bottom plate is between the IPT pad and the bottom of the removable pad, and wherein the bottom plate comprises one or more openings coincident with the one or more wire vias positioned in the frame.

12. The apparatus of claim 11, wherein the bottom plate comprises primarily aluminum and wherein the bottom of the opening comprises a metal plate, wherein the bottom plate of the removable pad is flush with the metal plate and in contact with the metal plate when the removable pad is positioned in the opening.

13. The apparatus of claim 10, wherein the one or more sealing mechanisms comprise one or more of:
    one or more o-rings mounted between the removable pad and the bottom of the opening in the frame, wherein at least one o-ring surrounds each of the one or more wire vias and inhibits liquid from the top surfaces of the frame and removable pad from reaching the one or more wire vias when the removable pad is mounted in the opening of the frame;
    a seal positioned within a gap between sides of the removable pad and sides of the opening, the seal filling the gap to inhibit liquid from the top surfaces of the frame and removable pad from reaching the bottom of the opening and the bottom of the removable pad when the removable pad is mounted in the opening of the frame;
    a seal positioned within a gap between sides of the removable pad and the locking ring, the seal filling the gap to inhibit liquid from top surfaces of the apparatus from reaching the bottom of the opening and the bottom of the removable pad when the removable pad is mounted in the opening of the frame;
    a seal positioned within a gap between sides of the frame and the locking ring, the seal filling the gap to inhibit liquid from top surfaces of the apparatus from reaching the bottom of the opening and the bottom of the removable pad when the removable pad is mounted in the opening of the frame;

a dielectric grease that fills a space surrounding wiring within each of the one or more wire vias; and wherein the removable pad comprises at least one coupling device connected to the bottom of the removable pad and extending into a wire via of the one or more wire vias, wherein the one or more sealing mechanisms comprise a seal positioned within a gap between the at least one coupling device and the wire via, the seal filling the gap to inhibit liquid from the top surfaces of the frame and removable pad from reaching the wire via.

14. The apparatus of claim 1, wherein the opening in the frame comprises a first opening and further comprising a second opening in the top surface of the frame and a cover for the second opening, the second opening positioned adjacent to the first opening, wherein the cover is sized to conform to the second opening, wherein the second opening of the frame is shaped to support the cover and the cover and the second opening are sized so that a top surface of the cover is substantially level with the top surface of the frame, wherein the frame with the cover mounted in the second opening of the frame are rated for vehicular traffic to drive over the cover without damaging the frame or the cover.

15. The apparatus of claim 14, wherein the second opening comprises one or more junction boxes positioned within one or more wire vias extending from a bottom of the removable pad positioned within the opening to an exterior edge of the frame and the one or more junction boxes are sized for one or more of:
pulling wire from the removable pad and to a location connected by conduit to the wire vias; and
connectors that connect wiring from the removable pad to wiring extending to the location connected by conduit to the wire vias.

16. The apparatus of claim 14, wherein the second opening comprises one or more electrical devices and wherein the one or more electrical devices are connected to the removable pad by wire running in the one or more wire vias, wherein the one or more electrical devices support wireless charging using the removable pad.

17. An apparatus comprising:
a frame comprising an opening in a top surface of the frame;
a removable pad with an inductive power transfer ("IPT") pad embedded therein, the IPT pad shaped to transmit power to a receiver pad positioned above the removable pad, the removable pad sized to conform to the opening, wherein the opening of the frame is shaped to support the removable pad and the removable pad and the opening are sized so that a top surface of the removable pad is substantially level with the top surface of the frame, wherein the removable pad comprises a polymeric matrix and the IPT pad is embedded in the polymeric matrix, wherein the removable pad comprises a bottom plate, a bottom surface of the bottom plate comprising a bottom of the removable pad wherein the IPT pad is positioned within the polymeric matrix and the bottom plate is between the IPT pad and the bottom of the removable pad;

one or more wire vias extending from a bottom of the removable pad positioned within the opening to an exterior edge of the frame, the bottom of the removable pad distal to the top surface of the removable pad, the one or more wire vias sized for wiring extending from the removable pad to one or more of at least the exterior edge of the frame and electrical devices within the frame, wherein the bottom plate comprises one or more openings coincident with the one or more wire vias positioned in the frame, one or more o-rings mounted between the removable pad and the bottom of the opening in the frame, wherein at least one o-ring surrounds each of the one or more wire vias and inhibits liquid from the top surfaces of the frame and removable pad from reaching the one or more wire vias when the removable pad is mounted in the opening of the frame;

a locking ring positioned around a perimeter of the top surface of the removable pad and one or more coupling mechanisms that couple the locking ring to the frame, wherein the locking ring exerts a downward force on the removable pad to secure the removable pad in the opening when the one or more coupling mechanisms couple the locking ring to the frame, wherein the frame and the removable pad are notched to accommodate the locking ring and a top surface of the locking ring flush with the top surface of the frame and the top surface of the pad; and a dielectric grease that fills a space surrounding wiring within each of the one or more wire vias, wherein, when the frame is located in a roadway, the top surface of the pad exposed to vehicular traffic, the frame, removable pad and locking ring mounted in the opening of the frame are rated for motor vehicular traffic to drive over the frame, the removable pad and the locking ring without damaging the frame, the removable pad or locking ring.

18. The apparatus of claim 17, further comprising one or more of:
a seal positioned within a gap between sides of the removable pad and the locking ring, the seal filling the gap to inhibit liquid from the top surfaces of the frame and removable pad from reaching the bottom of the opening and the bottom of the removable pad when the removable pad is mounted in the opening of the frame;
a seal positioned within a gap between sides of the removable pad and sides of the opening, the seal filling the gap to inhibit liquid from the top surfaces of the frame and removable pad from reaching the bottom of the opening and the bottom of the removable pad when the removable pad is mounted in the opening of the frame; and
a seal positioned within a gap between at least one coupler and the wire via, the seal filling the gap to inhibit liquid from the top surfaces of the frame and removable pad from reaching the wire via, wherein the removable pad comprises the at least one coupler connected to the bottom plate of the removable pad and extending into a wire via of the one or more wire vias.

* * * * *